United States Patent
Yokomizo et al.

(10) Patent No.: US 10,096,858 B2
(45) Date of Patent: Oct. 9, 2018

(54) NONAQUEOUS ELECTROLYTE AND NONAQUEOUS SECONDARY BATTERY

(71) Applicant: ADEKA CORPORATION, Tokyo (JP)

(72) Inventors: Tomofumi Yokomizo, Tokyo (JP); Toru Yano, Tokyo (JP); Hiroaki Watanabe, Tokyo (JP); Yohei Aoyama, Tokyo (JP); Tomomi Seri, Tokyo (JP); Yuta Nohara, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 92 days.

(21) Appl. No.: 15/109,902

(22) PCT Filed: Mar. 6, 2015

(86) PCT No.: PCT/JP2015/056679
§ 371 (c)(1),
(2) Date: Jul. 6, 2016

(87) PCT Pub. No.: WO2015/137253
PCT Pub. Date: Sep. 17, 2015

(65) Prior Publication Data
US 2016/0336621 A1    Nov. 17, 2016

(30) Foreign Application Priority Data

Mar. 14, 2014 (JP) ................ 2014-052568

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
CPC ......... H01M 10/0567; H01M 10/0525; H01M 2300/0025
See application file for complete search history.

(56) References Cited

U.S. PATENT DOCUMENTS

| | | |
|---|---|---|
| 5,626,981 A | 5/1997 | Simon et al. |
| 2002/0076619 A1 | 6/2002 | Yamada et al. |
| 2002/0110735 A1 | 8/2002 | Farnham et al. |
| 2003/0003370 A1 | 1/2003 | Arai et al. |

FOREIGN PATENT DOCUMENTS

| | | |
|---|---|---|
| JP | 63-102173 | 5/1988 |
| JP | 04-87156 | 3/1992 |
| JP | 05-74486 | 3/1993 |
| JP | 10-50342 | 2/1998 |
| JP | 2001-006729 | 1/2001 |
| JP | 2002-134169 | 5/2002 |
| JP | 2002-343423 | 11/2002 |
| JP | 2004-519829 | 7/2004 |

OTHER PUBLICATIONS

International Search Report, PCT/JP2015/056679, dated Apr. 7, 2015.

*Primary Examiner* — Laura Weiner
(74) *Attorney, Agent, or Firm* — Young & Thompson

(57) ABSTRACT

Provided are a nonaqueous electrolyte excellent in the prevention of overcharge and capable of retaining a small internal resistance and a high electrical capacity even after charge/discharge cycles and a nonaqueous secondary battery using the same. Specifically, the nonaqueous electrolyte is a lithium salt solution in an organic solvent and contains at least one compound having general formula (1), and the nonaqueous secondary battery includes a negative electrode capable of intercalating and deintercalating lithium, a positive electrode containing a transition metal and lithium, and the nonaqueous electrolyte. The details of formula (1) are also provided.

2 Claims, 2 Drawing Sheets

[Fig.1]
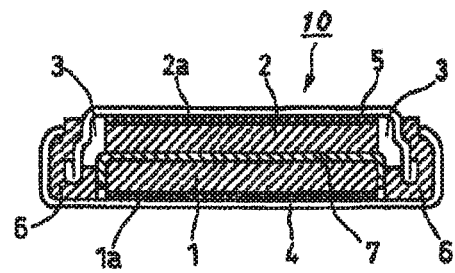
[Fig.2]
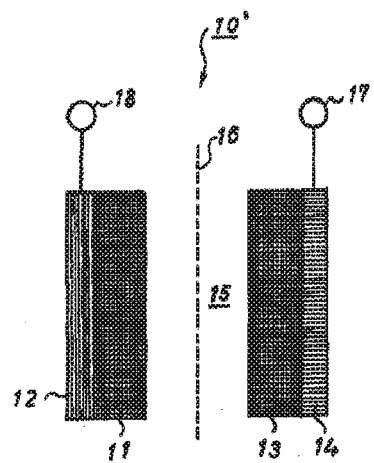

[Fig.3]
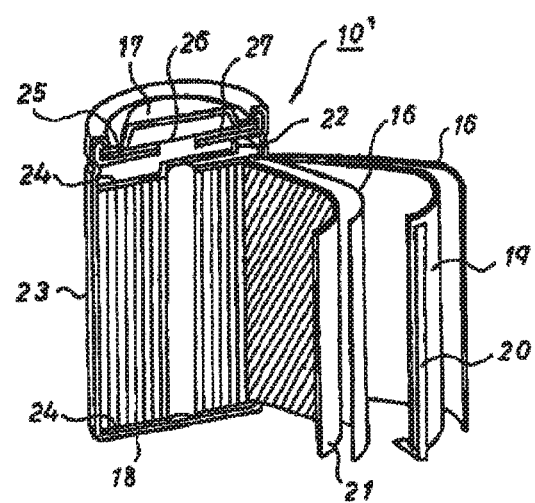

NONAQUEOUS ELECTROLYTE AND NONAQUEOUS SECONDARY BATTERY

TECHNICAL FIELD

This invention relates to a nonaqueous secondary battery, particularly a nonaqueous secondary battery having a nonaqueous electrolyte containing a specific compound.

BACKGROUND ART

With the recent spread of portable electronic equipment such as notebook computers, video camcorders, and personal digital assistances, nonaqueous electrolyte secondary batteries having high voltage and high energy density have come to be used widely as a power source. From the concern for the environmental protection, electric-powered vehicles and hybrid-powered vehicles utilizing electric power as a part of motive power have already been put to practical use.

Various additives for electrolyte have been proposed to provide nonaqueous secondary batteries with improved stability or electrical characteristics. Examples of such additives include 1,3-propane sultone (see patent document 1 below), vinyl ethylene carbonate (see patent document 2 below), vinylene carbonate (see patent document 3 below), 1,3-propane sultone or butane sultone (see patent document 4 below), vinylene carbonate (see patent document 5 below), and vinyl ethylene carbonate (see patent document 6 below). Among them, vinylene carbonate is widely used for its great effects. These additives are considered to form a stable film called a solid electrolyte interface covering the surface of a negative electrode, which film is expected to prevent reductive decomposition of an electrolyte.

A nonaqueous secondary battery can be charged to too high a voltage when excessive current is supplied due to, for example, incorrect operation. Such a phenomenon is called overcharge. Because an overcharged condition would greatly reduce the safety of a nonaqueous secondary battery, a nonaqueous secondary battery is provided with a mechanism for interrupting charging current when the voltage exceeds a preset threshold.

CITATION LIST

Patent document 1: JP 63-102173A
Patent document 2: JP 4-87156A
Patent document 3: JP 5-74486A
Patent document 4: JP 10-50342A
Patent document 5: U.S. Pat. No. 5,626,981
Patent document 6: JP 2001-6729A

SUMMARY OF THE INVENTION

Problem to be Solved by the Invention

An object of the invention is to provide a nonaqueous electrolyte effective in prevention of overcharge and capable of retaining a small internal resistance and a high capacity even after charge/discharge cycles and a nonaqueous secondary battery using the same.

Means for Solving the Problem

As a result of extensive investigations, the inventors have found that the above object is accomplished by using a nonaqueous electrolyte containing a compound having a specific structure and completed the invention.

The invention provides a nonaqueous electrolyte comprising a lithium salt, an organic solvent having dissolved therein the lithium salt, and at least one compound represented by general formula (1):

[Chem. 1]

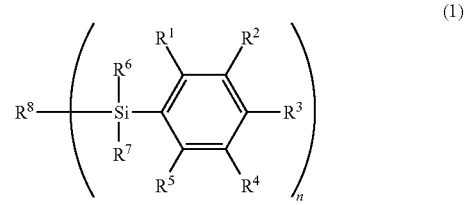

wherein $R^1$, $R^2$, $R^3$, $R^4$, and $R^5$ each independently represent a hydrogen atom, an optionally substituted aliphatic hydrocarbon group having 1 to 20 carbon atoms, a halogen atom, a nitrile group, a nitro group, an amino group, a carboxyl group, a hydroxyl group, a thiol group, a formyl group, a sulfo group, —$SiR^9R^{10}R^{11}$, or a phosphate group, the aliphatic hydrocarbon group optionally having the alkylene moiety thereof, inclusive of the moiety bonded to the benzene ring, interrupted by —O—, —CO—, —OCO—, —COO—, —O—CO—O—, —NR—, —S—, —SO—, —$SO_2$—, —NR—CO—, or —CO—NR— at 1 to 3 sites provided that the interrupting groups do not join each other, at least one of $R^1$, $R^2$, $R^3$, $R^4$, and $R^5$ being an aliphatic hydrocarbon group having 1 to 20 carbon atoms substituted with at least one halogen atom;

$R^8$ represents an n-valent group;

$R^6$, $R^7$, $R^9$, $R^{10}$, and $R^{11}$ each independently represent an optionally substituted aliphatic hydrocarbon group having 1 to 20 carbon atoms or an optionally substituted aromatic hydrocarbon group having 6 to 20 carbon atoms; and n represents an integer of 1 to 3.

The invention also provides a nonaqueous secondary battery comprising a negative electrode capable of intercalating and deintercalating lithium, a positive electrode containing a transition metal and lithium, and a nonaqueous electrolyte having a lithium salt dissolved in an organic solvent, wherein the nonaqueous electrolyte is the above-mentioned nonaqueous electrolyte.

Effect of the Invention

The use of the nonaqueous electrolyte containing the compound having a specific structure allows for the provision of a nonaqueous secondary battery excellent in prevention of overcharge and capable of retaining a small internal resistance and a high capacity even after charge/discharge cycles.

BRIEF DESCRIPTION OF THE DRAWINGS

FIG. 1 is a schematic cross-sectional view of an exemplary coin-shaped nonaqueous secondary battery according to the present invention.

FIG. 2 schematically illustrates the basic structure of a cylindrical nonaqueous secondary battery according to the invention.

FIG. 3 is a perspective view, with parts exploded and parts in cross-section, illustrating a cylindrical nonaqueous secondary battery of the invention.

BEST MODE FOR CARRYING OUT THE INVENTION

The nonaqueous electrolyte and the nonaqueous secondary battery according to the invention will be illustrated in detail with reference to their preferred embodiments.
<Nonaqueous Electrolyte>

The nonaqueous electrolyte for use in the invention, which has a lithium salt dissolved in an organic solvent, (hereinafter referred to as the nonaqueous electrolyte of the invention) will be described. The nonaqueous electrolyte of the invention contains the compound represented by general formula (1). The compound of formula (1) will be described first.

In general formula (1), the C1-C20 unsubstituted aliphatic hydrocarbon group as represented by $R^1$, $R^2$, $R^3$, $R^4$, and $R^5$ is a C1-20 saturated aliphatic hydrocarbon group or a C1-C20 unsaturated aliphatic hydrocarbon group. Examples of the C1-C20 saturated aliphatic hydrocarbon group include methyl, ethyl, propyl, 2-propyl, butyl, isobutyl, sec-butyl, tert-butyl, pentyl, isopentyl, hexyl, heptyl, octyl, decyl, dodecyl, and octadecyl. These aliphatic hydrocarbon groups may have the alkylene moiety thereof (including the moiety bonded to the benzene ring) interrupted by —O—, —CO—, —OCO—, —COO—, —NR—, —S—, —SO—, —SO$_2$—, —CO—NR— at 1 to 3 sites, provided that the interrupting groups do not join each other. When the interrupting group contains a carbon atom, the total number of the carbon atoms of the aliphatic hydrocarbon group inclusive of the carbon atom of the interrupting group should be within 20.

Examples of the C1-C20 unsaturated aliphatic hydrocarbon group include those corresponding to the above recited C1-C20 saturated aliphatic hydrocarbon groups with their C—C single bond replaced with a C=C double bond or a C≡C triple bond.

Specific examples of the aliphatic hydrocarbon group having a C=C double bond include vinyl, allyl, 3-butenyl, isobutenyl, 4-pentenyl, 5-hexenyl, and 2-(3-cyclohexenyl)ethyl. Specific examples of those having a C≡C triple bond include ethynyl, propargyl, and 3-butynyl.

The substituent that may be present on the C1-C20 saturated aliphatic hydrocarbon group is selected from a halogen atom, a nitrile, a nitro, an amino, a carboxyl, a hydroxyl, a thiol, a formyl, a sulfo, an —SiR$^9$R$^{10}$R$^{11}$, and a phosphate group. When the substituent contains a carbon atom, the total number of carbon atoms of the aliphatic hydrocarbon group inclusive of the carbon atom of the substituent should be within 20.

R represents methyl, ethyl, or propyl.

Examples of the halogen atom as represented by $R^1$, $R^2$, $R^3$, $R^4$, and $R^5$ in formula (1) include fluorine, chlorine, bromine, and iodine. This applies to the term "halogen" or "halogen atom" as otherwise referred to in the description.

At least one of $R^1$, $R^2$, $R^3$, $R^4$, and $R^5$ in formula (1) is a C1-C20 aliphatic hydrocarbon group substituted with at least one halogen atom.

While the number and position of the halogen atom(s) as a substituent are not particularly limited, preferred examples of the aliphatic hydrocarbon group substituted with at least one halogen atom include perfluoroalkyl groups, such as trifluoromethyl, pentafluoroethyl, heptafluoropropyl, and heptadecafluorooctyl; difluoromethane, monofluoromethane, and 1,1-difluoroethyl.

Preferred examples of the groups represented by $R^1$, $R^2$, $R^3$, $R^4$, and $R^5$ except the above illustrated C1-C20 aliphatic hydrocarbon groups substituted with at least one halogen atom include methyl, ethyl, halogen, nitrile, and C1-C10 alkoxy (e.g., methoxy, ethoxy, propoxy, isopropoxy, butoxy, sec-butoxy, tert-butoxy, and isobutoxy).

The group represented by $R^8$ in formula (1) is n-valent. When n=1, $R^8$ has the same meaning as $R^7$ hereinafter described. When n=2, $R^8$ is —O—, —CO—, —OCO—, —COO—, C1-C10 alkylene, phenylene, naphthylene, or a divalent group composed of two or more thereof. The C—C bond of the alkylene may be displaced by a C=C double bond or a C≡C triple bond.

Examples of the C1-C10 alkylene include methane-1,1-diyl, ethane-1,2-diyl, ethane-1,1-diyl, propane-1,3-diyl, propane-1,2-diyl, butane-1,4-diyl, 2-methylpropane-1,3-diyl, pentane-1,5-diyl, hexane-1,6-diyl, heptane-1,7-diyl, octane-1,8-diyl, nonane-1,9-diyl, and cyclohexane-1,4-diyl.

Specific examples of the divalent group as $R^8$ are shown below.

[Chem. 2]

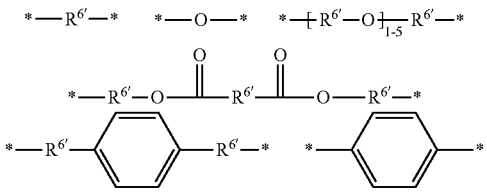

wherein $R^{6'}$ is the above described C1-C10 alkylene group.

When n=3, $R^8$ is a trivalent group selected from a trivalent C1-C10 aliphatic hydrocarbon group, a trivalent phenylene, a trivalent naphthylene, and a trivalent combination composed of two or more thereof. The trivalent group may contain —O—, —CO—, —OCO—, or —COO—. The C—C bond of the alkylene may be displaced by a C=C double bond or a C≡C triple bond.

Specific examples of the trivalent group as $R^8$ are shown below.

[Chem. 3]

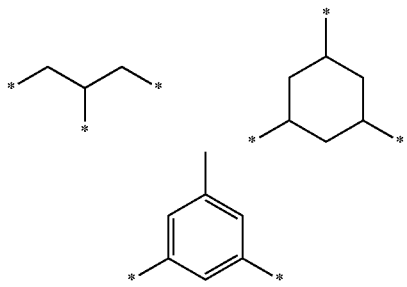

The C1-C20 aliphatic hydrocarbon group as represented by $R^6$, $R^7$, $R^9$, $R^{10}$, and $R^{11}$ is a C1-C20 saturated or unsaturated aliphatic hydrocarbon group. Examples of the C1-C20 saturated or unsaturated aliphatic hydrocarbon group include those described about $R^1$.

Examples of the C6-C20 aromatic hydrocarbon group as represented by $R^6$, $R^7$, $R^9$, $R^{10}$, and $R^{11}$ include phenyl, naphthyl, cyclohexylphenyl, biphenyl, terphenyl, fluorenyl, thiophenylphenyl, furanylphenyl, 2'-phenyl-propylphenyl, benzyl, and naphthylmethyl.

The substituent that may be present on the C1-C20 aliphatic hydrocarbon group or the C6-C20 aromatic hydrocarbon group as represented by $R^6$, $R^7$, $R^9$, $R^{10}$, and $R^{11}$ is selected from a halogen atom, a nitrile, a nitro, an amino, a carboxyl, a hydroxyl, a thiol, a formyl, a sulfo, and a phosphate group.

Of the compounds represented by formula (1) preferred are those in which $R^1$, $R^2$, $R^3$, $R^4$, and $R^5$ are groups described above as being preferred (i.e., at least one of R', $R^2$, $R^3$, $R^4$, and $R^5$ is a C1-C20 aliphatic hydrocarbon group substituted with at least one halogen atom, such as a perfluoroalkyl (e.g., trifluoromethyl, pentafluoroethyl, heptafluoropropyl, or heptadecafluorooctyl), difluoromethane, monofluoromethane, or 1,1-difluoroethyl, with the others being selected from methyl, ethyl, halogen, nitrile, and C1-C10 alkoxy (e.g., methoxy, ethoxy, propoxy, isopropoxy, butoxy, sec-butoxy, tert-butoxy, and isobutoxy)); and those in which $R^6$ or $R^7$ is methyl, ethyl, propyl, isopropyl, butyl, t-butyl, hexyl, vinyl, allyl, cyanomethyl, 2-cyanoethyl, 3-cyanopropyl, phenyl, benzyl, phenethyl, 2-methylphenyl, perfluorophenyl, or 2-(cyclohexyl-3-en-1-yl)ethyl; and those in which $R^8$ is, when n=1, methyl, ethyl, propyl, isopropyl, butyl, t-butyl, hexyl, vinyl, allyl, cyanomethyl, 2-cyanoethyl, 3-cyanopropyl, phenyl, benzyl, phenethyl, 2-methylphenyl, perfluorophenyl, or 2-(cyclohexyl-3-en-1-yl)ethyl or, when n=2, —$R^{6'}$— or 1,4-phenylene or, when n=3, cyclohexane-1,3,5-triyl or benzene-1,3,5-triyl.

Specific examples of the compounds having formula (1) include, but are not limited to, compound Nos. 1 through 44 shown below.

[Chem. 4]

No. 1

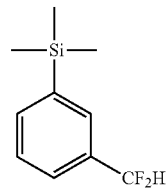

No. 2

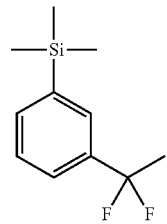

No. 3

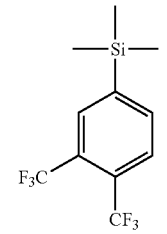

No. 4

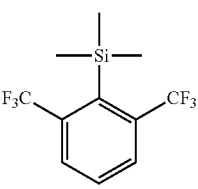

-continued

No. 5

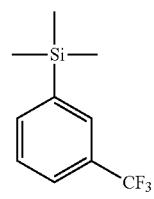

No. 6

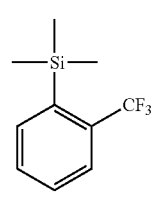

No. 7

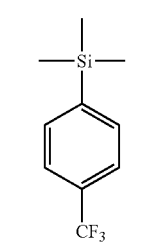

No. 8

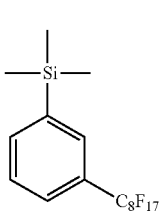

No. 9

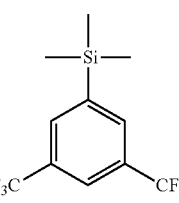

No. 10

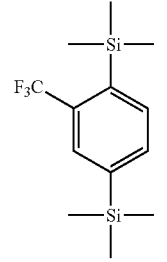

No. 11

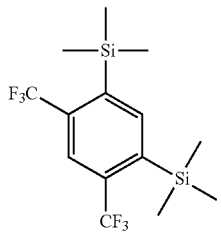

-continued
No. 12
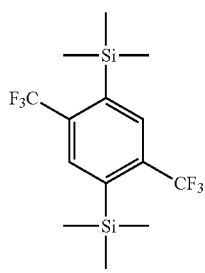
No. 13
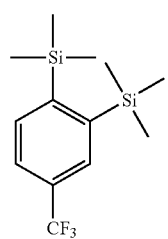
No. 14
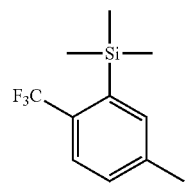
No. 15
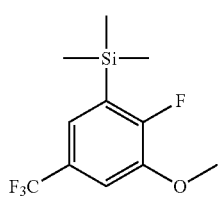
No. 16
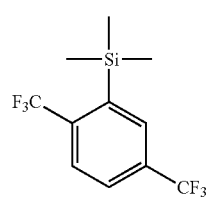
No. 17
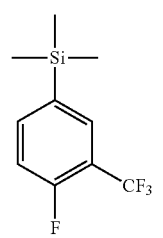
No. 18
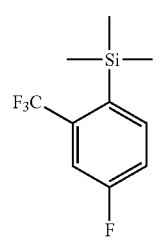
-continued
No. 19
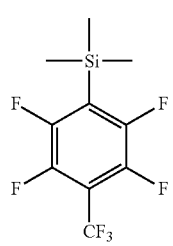
No. 20
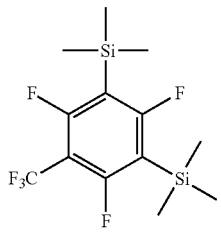
No. 21
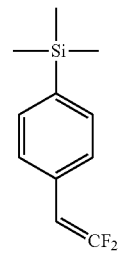
No. 22
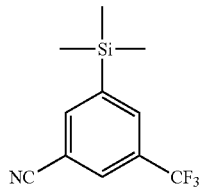
No. 23
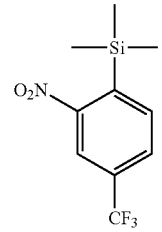
No. 24
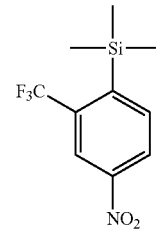

[Chem. 5]
No. 25 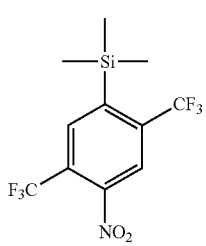
No. 26 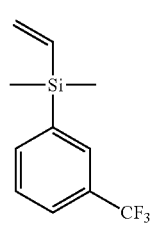
No. 27 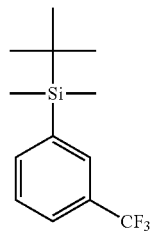
No. 28 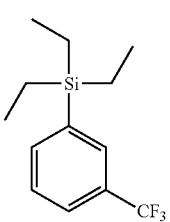
No. 29 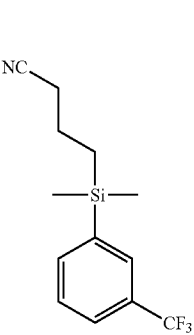
No. 30 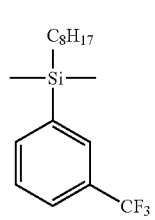
No. 31 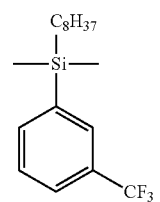
No. 32 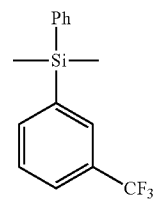
No. 33 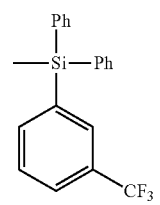
No. 34 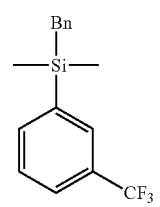
No. 35 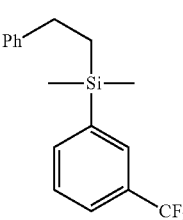
No. 36 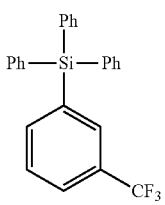
No. 37 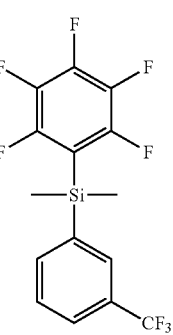

-continued

No. 38
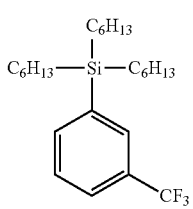

No. 39
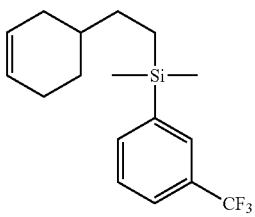

No. 40
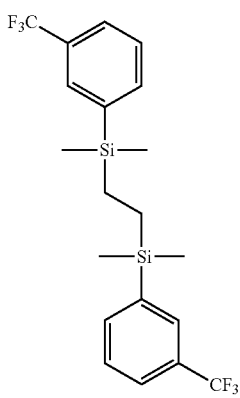

No. 41
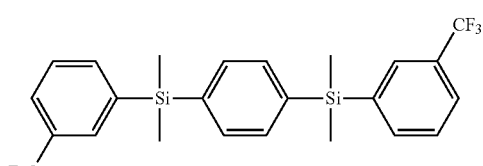

[Chem. 5A]

No. 42
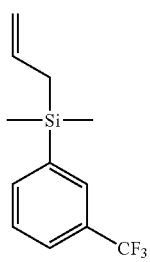

No. 43
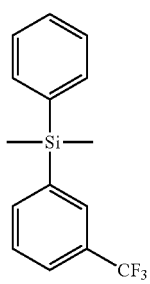

-continued

No. 44
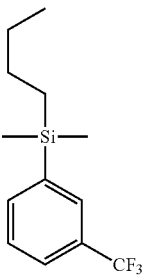

The compounds having formula (1) may be used in the nonaqueous electrolyte of the invention either individually or in combination of two or more thereof.

The content of the compound of formula (1) in the nonaqueous electrolyte of the invention is preferably 0.001 to 10 mass %, more preferably 0.01 to 8 mass %, even more preferably 0.1 to 5 mass %. If the content is too small, sufficient effects are not expected. If the content is too large, the resulting increase in effect is not worth the cost, and, what is even worse, the characteristics of the nonaqueous electrolyte can be affected adversely.

The organic solvent that can be used in the nonaqueous electrolyte of the invention may be one or more selected from those commonly used in nonaqueous electrolytes. Examples of useful organic solvents are saturated cyclic carbonate compounds, saturated cyclic ester compounds, sulfoxide compounds, sulfone compounds, amide compounds, saturated acyclic carbonate compounds, acyclic ether compounds, cyclic ether compounds, and saturated acyclic ester compounds.

Inter alia, saturated cyclic carbonate compounds, saturated cyclic ester compounds, sulfoxide compounds, sulfone compounds, and amide compounds have a high relative permittivity and therefore play a role to increase the dielectric constant of the nonaqueous electrolyte. Saturated cyclic carbonate compounds are particularly preferred. Examples of the saturated cyclic carbonate compounds include ethylene carbonate, 1-fluoroethylene carbonate, 1,2-propylene carbonate, 1,3-propylene carbonate, 1,2-butylene carbonate, 1,3-butylene carbonate, and 1,1-dimethylethylene carbonate. Examples of the saturated cyclic ester compounds include γ-butyrolactone, γ-valerolactone, γ-caprolactone, δ-hexanolacotne, and δ-octanolactone. Examples of the sulfoxide compounds include dimethyl sulfoxide, diethyl sulfoxide, dipropyl sulfoxide, diphenyl sulfoxide, and thiophene. Examples of the sulfone compounds include dimethyl sulfone, diethyl sulfone, dipropyl sulfone, diphenyl sulfone, sulfolane (also known as tetramethylene sulfone), 3-methylsulfolane, 3,4-dimethylsulfolane, 3,4-diphenylmethylsulfolane, sulfolene, 3-methylsulfolene, 3-ethylsulfolene, and 3-bromomethylsulfolene, with sulfolane and tetramethyl sulfolane being preferred. Examples of the amide compounds are N-methylpyrrolidone, dimethylformamide, and dimethylacetamide.

Of the above described organic solvents saturated acyclic carbonate compounds, acyclic ether compounds, cyclic ether compounds, and saturated acyclic ester compounds decrease the viscosity of the nonaqueous electrolyte and increase mobility of electrolyte ions thereby to improve battery characteristics, such as power density. To have a low viscosity brings about improvement on the low-temperature performance of the nonaqueous electrolyte. Inter alia, saturated acyclic carbonate compounds are preferred. Examples of suitable saturated acyclic carbonate compounds include dimethyl carbonate, ethylmethyl carbonate, diethyl carbonate, ethylbutyl carbonate, methyl-t-butyl carbonate, diisopropyl carbonate, and t-butylpropyl carbonate. Examples of the acyclic or cyclic ether compounds include dimethoxyethane, ethoxymethoxyethane, diethoxyethane, tetrahydrofuran, dioxolane, dioxane, 1,2-bis(methoxycarbonyloxy)ethane, 1,2-bis(ethoxycarbonyloxy)ethane, 1,2-bis(ethoxycarbonyloxy)propane, ethylene glycol bis(trifluoroethyl) ether, propylene glycol bis(trifluoroethyl) ether, ethylene glycol bis(trifluoromethyl) ether, and diethylene glycol bis(trifluoroethyl) ether, with dioxolane being preferred.

The saturated acyclic ester compounds are preferably mono- or diester compounds having a total of 2 to 8 carbon atoms per molecule, such as methyl formate, ethyl formate, methyl acetate, ethyl acetate, propyl acetate, isobutyl acetate, butyl acetate, methyl propionate, ethyl propionate, methyl butyrate, methyl isobutyrate, methyl trimethylacetate, ethyl trimethylacetate, methyl malonate, ethyl malonate, methyl succinate, ethyl succinate, methyl 3-methoxypropionate, ethyl 3-methoxypropionate, ethylene glycol diacetyl, and propylene glycol diacetyl. Preferred of them are methyl formate, ethyl formate, methyl acetate, ethyl acetate, propyl acetate, isobutyl acetate, butyl acetate, methyl propionate, and ethyl propionate.

In addition to this, acetonitrile, propionitrile, nitromethane, and their derivatives are also usable as an organic solvent.

The lithium salt that can be used in the nonaqueous electrolyte of the invention may be chosen from conventionally known lithium salts, such as $LiPF_6$, $LiBF_4$, $LiAsF_6$, $LiCF_3SO_3$, $LiCF_3CO_2$, $LiN(CF_3SO_2)_2$, $LiC(CF_3SO_2)_3$, $LiB(CF_3SO_3)_4$, $LiB(C_2O_4)_2$, $LiBF_2(C_2O_4)$, $LiSbF_6$, $LiSiF_5$, $LiAlF_4$, LiSCN, $LiClO_4$, LiCl, LiF, LiBr, LiI, $LiAlF_4$, $LiAlCl_4$, and their derivatives. It is preferred to use at least one of $LiPF_6$, $LiBF_4$, $LiClO_4$, $LiAsF_6$, $LiCF_3SO_3$, $LiC(CF_3SO_2)_3$, $LiCF_3SO_3$ derivatives, and $LiC(CF_3SO_2)_3$ derivatives in terms of good electrical characteristics.

The concentration of the lithium salt dissolved in the organic solvent is preferably 0.1 to 3.0 mol/l, more preferably 0.5 to 2.0 mol/l. At lithium salt concentrations lower than 0.1 mol/l, the resulting battery may fail to provide a sufficient current density. Salt concentrations higher than 3.0 mol/l can impair the stability of the nonaqueous electrolyte. The lithium salts described above may be used in combination of two or more thereof.

While one of the effects of the addition of the compound of formula (1) is overcharge protection, the nonaqueous electrolyte of the invention may further contain an additional overcharge protection agent. Examples of useful protection agents include aromatic compounds, such as biphenyl, alkylbiphenyls, terphenyl, partial hydrogenation products of terphenyl, cyclohexylbenzene, t-butylbenzene, t-amylbenzene, diphenyl ether, and dibenzofuran; partial fluorination products of the above aromatic compounds, such as 2-fluorobiphenyl, o-cyclohexylfluorobenzene, and p-cyclohexylfluorobenzene; and fluorine-containing anisole compounds, such as 2,4-difluoroanisole, 2,5-difluoroanisole, 2,6-difluoroanisole, and 3,5-difluoroanisole. Preferred of them are aromatic compounds, including biphenyl, alkylbiphenyls, terphenyl, partial hydrogenation products of terphenyl, cyclohexylbenzene, t-butylbenzene, t-amylbenzene, diphenyl ether, and dibenzofuran.

The amount of the overcharge protection agent other than the compound of formula (1) if added is not particularly limited but is preferably 1 to 500 parts by mass per 100 parts by mass of the compound of formula (1).

In order to make the nonaqueous electrolyte of the invention flame-retardant, a halogen-base, phosphorus-base, or other flame retardant may be added appropriately. The amount of the flame retardant, if added, is preferably 1 to 50 mass %, more preferably 3 to 10 mass %, relative to the organic solvent of the nonaqueous electrolyte of the invention. If the amount is too small, sufficient flame retardation is not exhibited. If the amount is too large, an increase in effect worth the cost is not obtained, and, what is even worse, the characteristics of the nonaqueous electrolyte can be affected adversely.

While the nonaqueous electrolyte of the invention is useful for both primary and secondary batteries, the above discussed effects are exhibited particularly when it is used as a nonaqueous electrolyte for the nonaqueous secondary battery as claimed in the invention, especially a lithium ion secondary battery.

<Nonaqueous Secondary Battery>

The nonaqueous secondary battery of the invention includes a negative electrode capable of intercalating and deintercalating lithium, a positive electrode containing a transition metal and lithium, and a nonaqueous electrolyte having a lithium salt dissolved in an organic solvent, being characterized in that the nonaqueous electrolyte is the nonaqueous electrolyte of the invention.

<Negative Electrode>

The negative electrode capable of lithium intercalation and deintercalation for use in the invention is not particularly limited. Preferably, the negative electrode is prepared by dispersing a negative electrode active material and a binder in an organic solvent or water, applying the resulting slurry to a current collector, followed by drying into a sheet form. Where needed, an electroconductive material is incorporated into the slurry.

Examples of the negative electrode active material include, but are not limited to, natural graphite, artificial graphite, graphitizing carbon, non-graphitizing carbon, lithium, lithium alloys, tin alloys, silicon alloys, silicon oxide, and titanium oxide.

Examples of the binder for the negative electrode include, but are not limited to, polyvinylidene fluoride, polytetrafluoroethylene, EPDM, SBR, NBR, fluororubber, and polyacrylic acid. The binder is preferably used in an amount of 0.001 to 5 parts by mass, more preferably 0.05 to 3 parts by mass, even more preferably 0.01 to 2 parts by mass, per 100 parts by mass of the negative electrode active material.

Examples of the solvent for preparing the slurry include, but are not limited to, N-methylpyrrolidone, dimethylformamide, dimethylacetamide, methyl ethyl ketone, cyclohexanone, methyl acetate, methyl acrylate, diethyltriamine, N,N-dimethylaminopropylamine, polyethylene oxide, and tetrahydrofuran. The solvent is used in an amount of 30 to 300 parts by mass, more preferably 50 to 200 parts by mass, per 100 parts by mass of the negative electrode active material.

The current collector of the negative electrode is usually made of copper, nickel, stainless steel, or nickel-plated copper.

Examples of the electroconductive material which may be used if necessary, include, but are not limited to, graphene particles, graphite particles, particles of amorphous carbon materials, such as carbon blacks (e.g., acetylene black and ketjen black) and needle coke, and carbon nanofiber.

<Positive Electrode>

The positive electrode containing a transition metal and lithium for use in invention may be, as usual with common secondary batteries, prepared by dispersing a positive electrode active material, a binder, an electroconductive material, and the like in an organic solvent or water, applying the resulting slurry to a current collector, followed by drying into a sheet form. The positive electrode active material contains a transition metal and lithium, preferably a substance containing both a single transition metal and lithium. For example, a lithium-transition metal complex oxide, a lithium-containing transition metal phosphate compound, or a mixture thereof may be used. The transition metal of the lithium-transition metal complex oxide is preferably vanadium, titanium, chromium, manganese, iron, cobalt, nickel, copper, or the like. Examples of the lithium-transition metal complex oxide include lithium-cobalt complex oxides, such as $LiCoO_2$; lithium-nickel complex oxides, such as $LiNiO_2$; and lithium-manganese complex oxides, such as $LiMnO_2$, $LiMn_2O_4$, and $Li_2MnO_3$. Part of the transition metal atom that mainly composes the lithium-transition metal complex oxide may be substituted with other metals, e.g., aluminum, titanium, vanadium, chromium, manganese, iron, cobalt, lithium, nickel, copper, zinc, magnesium, gallium, or zirconium. Specific examples of such substituted lithium-transition metal complex oxides include $LiNi_{0.5}Mn_{0.5}O_2$, $LiN_{0.80}Co_{0.17}Al_{0.03}O_2$, $LiN_{1/3}CO_{1/3}Mn_{1/3}O_2$, $LiMm_{1.8}Al_{0.2}O_4$, and $LiMn_{1.5}Ni_{0.5}O_4$. The transition metal of the lithium-containing transition metal phosphate compound is preferably vanadium, titanium, manganese, iron, cobalt, nickel, or the like. Examples of the lithium-containing transition metal phosphate compound include iron phosphates, such as $LiFePO_4$, and cobalt phosphates, such as $LiCoPO_4$. Part of the transition metal atom that mainly composes the lithium-containing transition metal phosphate compound may be substituted with other metals, e.g., aluminum, titanium, vanadium, chromium, manganese, iron, cobalt, lithium, nickel, copper, zinc, magnesium, gallium, zirconium, or niobium.

It is preferred to use a manganese-containing lithium complex oxide as the positive electrode active material for use in the positive electrode of the nonaqueous secondary battery of the invention because the effects of the compound of formula (1) added to the nonaqueous electrolyte are easily exhibited. Of manganese-containing lithium complex oxides preferred are $Li_{1.1}Mn_{1.8}Mg_{6.1}O_4$, $Li_{1.1}Mn_{1.85}Al_{0.05}O_4$, $LiNi_{1/3}Co_{1/3}Mn_{1/3}O_2$, and $LiNi_{0.5}Co_{0.2}Mn_{0.3}O_2$ because of their excellent performance as a positive electrode active material.

Examples of the binder and the solvent for making a slurry for the positive electrode are the same as those described for the negative electrode. The binder is preferably used in an amount of 0.001 to 20 parts by mass, more preferably 0.01 to 10 parts by mass, even more preferably 0.02 to 8 parts by mass, per 100 parts by mass of the positive electrode active material. The solvent is used in an amount of 30 to 300 parts by mass, more preferably 50 to 200 parts by mass, per 100 parts by mass of the positive electrode active material.

Examples of the electroconductive material for the positive electrode include, but are not limited to, graphene particles, graphite particles, particles of amorphous carbon materials, such as carbon blacks (e.g., acetylene black and ketjen black) and needle coke, and carbon nanofiber. The electroconductive material is preferably used in an amount of 0.01 to 20 parts by mass, more preferably 0.1 to 10 parts by mass, per 100 parts by mass of the positive electrode active material.

The current collector of the positive electrode is usually made of aluminum, stainless steel, or nickel-plated steel.

It is preferable to interpose a separator between the positive and the negative electrode in the nonaqueous electrolyte secondary battery of the invention. A commonly employed microporous polymer film can be used as a separator with no particular restriction. Polymer materials providing a microporous film separator include polyethylene, polypropylene, polyvinylidene fluoride, polyvinylidene chloride, polyacrylonitrile, polyacrylamide, polytetrafluoroethylene, polysulfone, polyether sulfone, polycarbonate, polyamide, polyimide, polyethers such as polyethylene oxide and polypropylene oxide, celluloses such as carboxymethyl cellulose and hydroxypropyl cellulose, poly (meth)acrylic acid and esters thereof; derivatives of these polymers; copolymers of monomers of the recited polymers; and polyblends of these polymer materials. The separator may be a single film or a composite film composed of two or more films. Various additives may be added to the separator film with no particular limitation on the kind and amount. A film made of polyethylene, polypropylene, polyvinylidene fluoride, or polysulfone is particularly preferred for use in the nonaqueous secondary battery of the invention.

The separator film is microporous for allowing the electrolyte ions to penetrate therethrough. Such a microporous film is prepared by (1) a phase separation method comprising inducing microphase separation in a solution of a polymer in a solvent in film form and removing the solvent by extraction and (2) a stretching method comprising extruding a molten polymer at a high draft ratio, heat treating the extruded film to unidirectionally align the crystals, and stretching the film to form voids between crystals. The method of microporous film formation is chosen according to the film material.

In order to ensure safety of the nonaqueous secondary battery of the invention, a phenol antioxidant, a phosphorus antioxidant, a thioether antioxidant, a hindered amine compound, or a like stabilizer may be added to the positive electrode materials, the nonaqueous electrolyte, or the separator.

The nonaqueous secondary battery of the invention is not particularly limited in shape and may be coin-shaped, cylindrical, or rectangular. FIG. 1 illustrates an example of a coin-shaped nonaqueous cell battery of the invention, and FIGS. 2 and 3 each illustrate an example of a cylindrical nonaqueous secondary battery cell of the invention.

The coin cell 10 illustrated in FIG. 1 has a positive electrode 1 capable of deintercalating lithium ions, a positive electrode current collector 1a, a negative electrode 2 made of a carbonaceous material capable of intercalating/deintercalating lithium ions released from the positive electrode, a negative electrode current collector 2a, a nonaqueous electrolyte 3 according to the invention, a positive electrode case 4 made of stainless steel, a negative electrode case 5 made of stainless steel, a polypropylene gasket 6, and a polyethylene separator 7.

As illustrated in FIGS. 2 and 3, the cylindrical battery cell 10' includes a negative electrode 11, a negative electrode current collector 12, a positive electrode 13, a positive electrode current collector 14, a nonaqueous electrolyte 15 of the present invention, a separator 16, a positive electrode terminal 17, a negative electrode terminal 18, a negative electrode plate 19, a negative electrode lead 20, a positive electrode plate 21, a positive electrode lead 22, a case 23, an insulating plate 24, a gasket 25, a safety valve 26, and a PTC element 27.

Example

The invention will now be illustrated in greater detail with reference to Examples, but it should be understood that the invention is not construed as being limited thereto. All the parts and percentages are by mass unless otherwise stated.

Synthesis Examples 1 through 9 show synthesis of compounds of formula (1). Examples 1 through 10 and Comparative Examples 1 to 3 show nonaqueous secondary batteries of the invention and their comparative examples.

Synthesis Example 1—Synthesis of Compound No. 1

In a flask was put 6.32 g (0.26 mmol) of magnesium and dried under reduced pressure, followed by purging with argon. To the flask was added 100 ml of tetrahydrofuran, and a few drops of 1-bromo-3-trifluoromethylbenzene were added thereto while cooling with ice. An additional 100 ml of tetrahydrofuran was added, and then 1-bromo-3-trifluoromethylbenzene was slowly added dropwise to give a final total content of 1-bromo-3-trifluoromethylbenene of 45.0 g (0.20 mmol). After the mixture was stirred at room temperature for 1 hour, 50.5 ml (0.40 mmol) of chlorotrimethylsilane was added dropwise while cooling with ice, followed by stirring at room temperature for about 15 hours. To the reaction mixture were added 200 ml of an ammonium chloride aqueous solution and 300 ml of ethyl acetate, followed by oil/water separation. The separated organic layer was dried over anhydrous sodium sulfate, filtered, and evaporated. The resulting crude product was distilled (10 mmHg, oil bath: 110°-115° C., gas: 90°-95° C.) to collect 28.4 g of a colorless liquid in a yield of 64%. The liquid was identified to be compound No. 1 by $^1$H-NMR and IR analyses. The analytical results are shown in Table 1.

Synthesis Example 2—Synthesis of Compound No. 2

Into a flask having been purged with argon were put 3.12 ml (0.0230 mol) of 1-bomo-2-trifluoromethylbenzene and 30.0 ml of tetrahydrofuran, and 14.4 ml of a 1.60 M hexane solution of n-butyl lithium was slowly added thereto dropwise at −75° C. Then, 1.98 ml (0.0253 mol) of chlorotrimethylsilane was added dropwise under ice cooling, followed by stirring at room temperature for 30 minutes. To the reaction mixture were added 50.0 ml of water and 50.0 ml of ethyl acetate for oil/water separation. The separated organic layer was dried over anhydrous sodium sulfate, filtered, and evaporated. The resulting crude product was distilled (5.00 mmHg, oil bath: 80° C., gas: 70° C.) to collect 0.768 g of a colorless liquid in a yield of 15.3%. The liquid was identified to be compound No. 2 by $^1$H-NMR and IR analyses. The analytical results are shown in Table 1.

Synthesis Example 3—Synthesis of Compound No. 3

In a flask was put 3.23 g (0.133 mol) of magnesium and dried under reduced pressure, followed by purging with argon. To the flask was added 120 ml of tetrahydrofuran, and 15.3 ml (0.111 mol) of 1-bromo-4-trifluoromethylbenzene was slowly added thereto dropwise while cooling with ice. After the mixture was stirred at room temperature for 1 hour, 21.0 ml (0.167 mmol) of chlorotrimethylsilane was added thereto dropwise, followed by stirring at room temperature for 15 hours. To the reaction mixture were added 200 ml of an ammonium chloride aqueous solution and 250 ml of ethyl acetate, followed by oil/water separation. The separated organic layer was dried over anhydrous sodium sulfate, filtered, and evaporated. The resulting crude product was distilled (60 mmHg, oil bath: 110° C., gas: 90° C.) to collect 13.1 g of a colorless liquid in a yield of 54.2%. The liquid was identified to be compound No. 3 by $^1$H-NMR and IR analyses. The analytical results are shown in Table 1.

Synthesis Example 4—Synthesis of Compound No. 9

In a flask was put 0.990 g (0.0410 mol) of magnesium and dried under reduced pressure, followed by purging with argon. To the flask was added 35.0 ml of tetrahydrofuran, and 5.40 ml (0.0320 mol) of 1-bromo-3,5-bis(trifluoromethyl)benzene was slowly added thereto dropwise while cooling with ice, followed by stirring at room temperature for 1 hour. To the mixture was added dropwise 6.44 ml (0.0510 mol) of chlorotrimethylsilane under ice cooling, followed by stirring at 60° C. for 6 hours. To the reaction mixture were added 200 ml of an ammonium chloride aqueous solution and 300 ml of ethyl acetate for oil/water separation. The separated organic layer was dried over anhydrous sodium sulfate, filtered, and evaporated. The resulting crude product was purified using a medium pressure column and hexane as a developing solvent to give 1.89 g of a colorless liquid in a yield of 21.0%. The liquid was identified to be compound No. 9 by $^1$H-NMR and IR analyses. The analytical results are shown in Table 1.

Synthesis Example 5—Synthesis of Compound No. 26

In a flask was put 3.60 g (0.140 mol) of magnesium and dried under reduced pressure, followed by purging with argon. To the flask was added 100 ml of tetrahydrofuran, and 17.0 ml (0.123 mol) of 1-bromo-3-trifluoromethylbenzene was slowly added thereto dropwise while cooling with ice, followed by stirring at room temperature for 1 hour. To the mixture was added 25.0 ml (0.184 mol) of chlorodimethylvinylsilane dropwise while cooling with ice, followed by stirring at 50° C. for 2 hours. To the reaction mixture were added 200 ml of an ammonium chloride aqueous solution and 200 ml of ethyl acetate, followed by oil/water separation. The separated organic layer was dried over anhydrous sodium sulfate, filtered, and evaporated. The resulting crude product was distilled (10 mmHg, oil bath: 80° C., gas: 68° C.) to give 19.5 g of a colorless liquid in a yield of 68.9%. The liquid was identified to be compound No. 26 by $^1$H-NMR and IR analyses. The analytical results are shown in Table 1.

Synthesis Example 6—Synthesis of Compound No. 40

In a flask was put 5.83 g (0.24 mmol) of magnesium and dried under reduced pressure, followed by purging with argon. To the flask was added 150 ml of tetrahydrofuran, and 45.0 g (0.20 mmol) of 1-bromo-3-trifluoromethylbenzene was slowly added thereto dropwise while cooling with ice, followed by stirring at room temperature for 1 hour. To the mixture was added 21.5 g (0.10 mmol) of 1,2-bis(chlorodimethylsilyl)ethane dropwise while cooling with ice, followed by stirring at room temperature for about 15 hours. To the reaction mixture were added 200 ml of an ammonium chloride aqueous solution and 300 ml of ethyl acetate, followed by oil/water separation. The separated organic layer was dried over anhydrous sodium sulfate, filtered, and evaporated. The resulting crude product was distilled (3 mmHg, oil bath: 180°-190° C., gas: 145°-155° C.) to collect 18.2 g of a colorless liquid in a yield of 42%. The liquid was identified to be compound No. 40 by $^1$H-NMR and IR analyses. The analytical results are shown in Table 1.

Synthesis Example 7—Synthesis of Compound No. 42

In a flask was put 2.91 g (0.120 mol) of magnesium and dried under reduced pressure, followed by purging with argon. To the flask was added 50 ml of tetrahydrofuran, and 13.8 ml (0.100 mol) of 1-bromo-3-trifluoromethylbenzene was slowly added thereto dropwise while cooling with ice, followed by stirring at room temperature for 1 hour. To the mixture was added 7.57 ml (0.0500 mmol) of chlorodimethylallylsilane dropwise while cooling with ice, followed by stirring at 50° C. for 2 hours. To the reaction mixture were added 100 ml of an ammonium chloride aqueous solution and 100 ml of ethyl acetate, followed by oil/water separation. The separated organic layer was dried over anhydrous sodium sulfate, filtered, and evaporated. The resulting crude product was distilled (20 mmHg, oil bath: 85° C., gas: 63° C.) to collect 7.10 g of a colorless liquid in a yield of 58.1%. The liquid was identified to be compound No. 42 by $^1$H-NMR and IR analyses. The analytical results are shown in Table 1.

Synthesis Example 8—Synthesis of Compound No. 43

In a flask was put 4.38 g (0.180 mol) of magnesium and dried under reduced pressure, followed by purging with argon. To the flask was added 150 ml of tetrahydrofuran, and 20.7 ml (0.150 mol) of 1-bromo-3-trifluoromethylbenzene was slowly added thereto dropwise while cooling with ice, followed by stirring at room temperature for 1 hour. To the mixture was added 12.4 ml (0.0750 mol) of chlorodimethylphenylsilane dropwise while cooling with ice, followed by stirring at 60° C. for 2 hours. To the reaction mixture were added 200 ml of an ammonium chloride aqueous solution and 300 ml of ethyl acetate, followed by oil/water separation. The separated organic layer was dried over anhydrous sodium sulfate, filtered, and evaporated. The resulting crude product was distilled (0.50 mmHg, oil bath: 115° C., gas: 91° C.) to give 17.2 g of a colorless liquid in a yield of 81.8%. The liquid was identified to be compound No. 43 by $^1$H-NMR and IR analyses. The analytical results are shown in Table 1.

Synthesis Example 8—Synthesis of Compound No. 44

In a flask was put 4.48 g (0.184 mol) of magnesium and dried under reduced pressure, followed by purging with argon. To the flask was added 100 ml of tetrahydrofuran, and 20.7 ml (0.150 mol) of 1-bromo-3-trifluoromethylbenzene was slowly added thereto dropwise while cooling with ice, followed by stirring at room temperature for 1 hour. To the mixture was added 6.62 ml (0.0384 mol) of butyldimethylchlorosilane dropwise while cooling with ice, followed by stirring at 50° C. for 2 hours. To the reaction mixture were added 200 ml of an ammonium chloride aqueous solution and 300 ml of ethyl acetate, followed by oil/water separation. The separated organic layer was dried over anhydrous sodium sulfate, filtered, and evaporated. The resulting crude product was distilled (4.00 mmHg, oil bath: 120° C., gas: 95° C.) to give 2.03 g of a colorless liquid in a yield of 20.3%. The liquid was identified to be compound No. 44 by $^1$H-NMR and IR analyses. The analytical results are shown in Table 1.

TABLE 1

| Compound | | |
|---|---|---|
| No. 1 | $^1$H-NMR | 7.73 (s, 1H), 7.69 (d, 1H), 7.59 (d, 1H), 7.46 (t, 1H), 0.30 (s, 9H). |
| | IR | 2958, 1409, 1319, 1265, 1251, 1163, 1115, 1089, 1074, 928, 856, 836, 798, 753, 702, 653, 621. |
| No. 2 | $^1$H-NMR | 7.69 (m, 2H), 7.48 (m, 2H), 0.35 (s, 9H). |
| | IR | 2955, 2900, 1434, 1312, 1254, 1165, 1113, 1047, 1035, 840, 772, 728, 696, 649, 624, 597. |
| No. 3 | $^1$H-NMR | 7.62 (d, 2H), 7.5 (d, 2H), 0.29 (s, 9H). |
| | IR | 3033, 2958, 2900, 1610, 1390, 1323, 1267, 1251, 1163, 1123, 1059, 1020, 839, 823759, 725, 696, 626, 600. |
| No. 9 | $^1$H-NMR | 7.90 (s, 2H), 7.84 (s, 1H), 0.35 (s, 9H). |
| | IR | 2961, 2900, 1616, 1360, 1276, 1254, 1172, 1124, 1105, 1096, 896, 863, 836, 797, 756, 707, 681, 625. |
| No. 26 | $^1$H-NMR | 7.74 (s, 1H), 7.69 (d, 1H), 7.61 (d,1H), 7.46 (t, 1H), 6.27 (dd, 1H), 6.10 (dd, 1H), 5.78 (dd, 1H), 0.39 (s, 6H). |
| | IR | 3054, 2960, 2900, 1600, 1408, 1319, 1251, 1164, 1115, 1088, 1073, 1007, 956, 830, 794, 773, 702, 653, 612, 529. |
| No. 40 | $^1$H-NMR | 7.68 (s, 2H), 7.62 (d, 2H), 7.60 (d, 2H), 7.45 (t, 2H), 0.65 (s, 4H), 0.27 (s, 9H). |
| | IR | 2957, 2906, 1409, 1318, 1265, 1250, 1184, 1111, 1088, 1072, 827, 790, 774, 753, 701, 653, 621. |
| No. 42 | $^1$H-NMR | 7.73 (s, 1H), 7.68 (d, 1H), 7.61 (d, 1H), 7.46 (t, 1H), 5.75 (tdd, 1H), 4.89 (m, 2H), 1.78 (d, 2H), 0.31 (s, 6H). |
| | IR | 3079, 2959, 2902, 1630, 1600, 1409, 1319, 1251, 1163, 1115, 1073, 1036, 992, 929, 897, 836, 791, 754, 702, 656. 571. |
| No. 43 | $^1$H-NMR | 7.75 (s, 1H), 7.67 (d, 1H), 7.61 (d, 1H), 7.48-7.54 (m, 2H), 7.45 (t, 1H), 7.34-7.44 (m, 3H), 0.59 (s, 6H). |
| | IR | 3070, 2959, 2900, 1599, 1428, 1410, 1319, 1251, 1164, 1113, 1073, 998, 929, 824, 793, 774, 731, 699, 656, 643. |

TABLE 1-continued

| Compound | | |
|---|---|---|
| No. 44 | $^1$H-NMR | 7.72 (s, 1H), 7.68 (d, 1H), 7.59 (d, 1H), 7.46 (t, 1H), 1.39-1.24 (m, 4H), 0.88 (t, 3H), 0.77 (t, 2H). |
| | IR | 2957, 2923, 2874, 1600, 1465, 1409, 1319, 1265, 1250, 1164, 1115, 1073, 927, 878, 837, 794, 778, 702, 653. |

Examples 1 to 10 and Comparative Examples 1 to 3

Making and Evaluation of Nonaqueous Secondary Battery

Nonaqueous secondary batteries (lithium secondary batteries) were made in accordance with the procedure below.
(a) Making of Positive Electrode
Ninety parts of $LiMn_2O_4$ as an active material, 5 parts of acetylene black as an electroconductive material, and 5 parts of polyvinylidene fluoride as a binder were mixed, and the mixture was dispersed in 140 parts of N-methyl-2-pyrrolidone to prepare a slurry. The slurry was applied to an aluminum current collector, dried, and pressed to make a positive electrode plate, which was cut to size to provide a disk-shaped positive electrode.
(b) Making of Negative Electrode
Synthetic graphite (97.0 parts) as an active material, 1.5 parts of styrene-butadiene rubber as a binder, and 1.5 parts of carboxymethyl cellulose as a thickener were mixed, and the mixture was dispersed in 120 parts of water. The resulting slurry was applied to a copper current collector, dried, and pressed to make a negative electrode plate, which was cut to size to provide a disk-shaped negative electrode.
(c) Preparation of Electrolyte Solution $LiPF_6$ was Dissolved in a Mixed Solvent Consisting of 30 vol % Ethylene carbonate, 40 vol % ethyl methyl carbonate, and 30 vol % dimethyl carbonate in a concentration of 1 mol/l.
(d) Preparation of Nonaqueous Electrolyte
An additive selected from the compounds of the invention synthesized in Synthesis Examples 1 to 9 and comparative compounds 1 and 2 described below was dissolved in the electrolyte solution in the ratio shown in Table 2 below to prepare nonaqueous electrolytes of the invention and comparative nonaqueous electrolytes. In Table 2 the figures in the parentheses represent the concentration (mass %) in the nonaqueous electrolyte.
Comparative Compound 1: Cyclohexylbenzene
Comparative Compound 2: Trimethylsilylbenzene
(e) Assembly of Battery
The disk-shaped positive and negative electrodes were put into a case with a 25 μm thick polyethylene microporous film interposed therebetween. The nonaqueous electrolyte of the invention or the comparative nonaqueous electrolyte shown in Table 2 was poured into the case, and the case was closed and sealed to make 20 mm diameter, 3.2 mm thick coin-shaped lithium secondary batteries of Examples 1 to 10 and Comparative Examples 1 to 3.

TABLE 2

| | Electrolyte Additive | Discharge Capacity Ratio | Overcharge Resistance |
|---|---|---|---|
| Example 1 | No. 1 (4.1) | 100 | 770 |
| Example 2 | No. 1 (3.0) | 100 | 650 |
| Example 3 | No. 2 (4.1) | 99 | 700 |
| Example 4 | No. 3 (4.1) | 100 | 720 |
| Example 5 | No. 9 (5.4) | 99 | 1200 |
| Example 6 | No. 26 (5.4) | 85 | 550 |
| Example 7 | No. 40 (4.1) | 100 | 690 |
| Example 8 | No. 42 (4.7) | 93 | 400 |
| Example 9 | No. 43 (5.2) | 95 | 430 |
| Example 10 | No. 44 (4.9) | 100 | 600 |
| Compara. Example 1 | — | 100 | 100 |
| Compara. Example 2 | Compara. 1 (3.0) | 101 | 250 |
| Compara. Example 3 | Compara. 2 (2.8) | 101 | 320 |

The lithium secondary batteries of Examples 1 to 10 and Comparative Examples 1 to 3 were tested for initial discharge capacity and resistance to overcharge by the test methods described below. The test results obtained are shown in Table 2. A higher discharge capacity ratio indicates higher initial performance of the nonaqueous secondary battery. A higher value of resistance to overcharge indicates higher resistance to overcharge of the nonaqueous secondary battery.

(1) Test Method for Determination of Discharge Capacity Ratio

The lithium secondary battery was placed in a thermostat at 20° C. and charged by the CC/CV method at a constant current of 0.3 mA/cm$^2$, which corresponded to a rate of 0.2 C, to 4.2 V, and then discharged at a constant current of 0.3 mA/cm$^2$, which corresponded to a rate of 0.2 C, to 3.0 V for 5 cycles. Thereafter, the battery was charged by the CC/CV method at 0.3 mA/cm$^2$ to 4.2 V and discharged at 0.3 mA/cm$^2$ to 3.0 V. The discharge capacity in this 6th discharge was taken as an initial discharge capacity of the battery. A ratio of the initial discharge capacity as measured to that of Comparative Example 1, in which no additive was added to the electrolyte, being taken as 100, was calculated as follows to give a discharge capacity ratio (%).

Discharge capacity ratio (%)=[(initial discharge capacity)/(initial discharge capacity of Comparative Example 1)]×100

(2) Test Method for Evaluating Resistance to Overcharge

The lithium secondary battery was placed in a thermostat at 20° C. and overcharged by the CC/CV method at a constant current of 0.3 mA/cm$^2$, which corresponded to a rate of 0.2 C, to 5.5 V, and the capacity (mAh/g) was measured. The capacity as measured was expressed relatively taking that of Comparative Example 1, in which no electrolyte additive was used, as 100.

It is apparent from the above results that the compound having formula (1) that is used in the nonaqueous electrolyte of the invention is capable of reducing an increase in voltage in an overcharged state without being accompanied by reduction in battery characteristics in terms of discharge capacity.

REFERENCE SIGN LIST

1: positive electrode
1a: positive electrode current collector
2: negative electrode
2a: negative electrode current collector
3: electrolyte
4: positive electrode case
5: negative electrode case
6: gasket
7: separator
10: coin-shaped nonaqueous secondary battery
10': cylindrical nonaqueous secondary battery
11: negative electrode
12: negative electrode current collector
13: positive electrode
14: positive electrode current collector
15: electrolyte
16: separator
17: positive electrode terminal
18: negative electrode terminal
19: negative electrode plate
20: negative electrode lead
21: positive electrode
22: positive electrode lead
23: case
24: insulating plate
25: gasket
26: safety valve
27: PTC element

The invention claimed is:

1. A nonaqueous electrolyte comprising a lithium salt, an organic solvent having dissolved therein the lithium salt, and at least one compound represented by general formula (1):

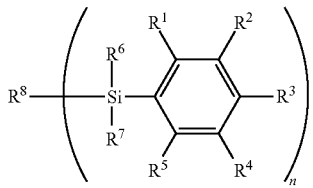

wherein $R^1$, $R^2$, $R^3$, $R^4$, and $R^5$ each independently represent a hydrogen atom, an optionally substituted aliphatic hydrocarbon group having 1 to 20 carbon atoms, a halogen atom, a nitrile group, a nitro group, an amino group, a carboxyl group, a hydroxyl group, a thiol group, a formyl group, a sulfo group, or a phosphate group, the aliphatic hydrocarbon group optionally having the alkylene moiety thereof, inclusive of the moiety bonded to the benzene ring, interrupted by —O—, —CO—, —OCO—, —COO—, —O—CO—O—, —NR—, —S—, —SO—, —SO$_2$—, —NR—CO—, or —CO—NR— at 1 to 3 sites provided that the interrupting groups do not join each other, at least one of $R^1$, $R^2$, $R^3$, $R^4$, and $R^5$ being an aliphatic hydrocarbon group having 1 to 20 carbon atoms substituted with at least one halogen atom;

R represents a methyl group, an ethyl group, or a propyl group;

$R^8$ represents an n-valent group;

$R^6$ and $R^7$ each independently represent an optionally substituted aliphatic hydrocarbon group having 1 to 20 carbon atoms or an optionally substituted aromatic hydrocarbon group having 6 to 20 carbon atoms; and n represents an integer of 1 to 3.

2. A nonaqueous secondary battery comprising a negative electrode capable of intercalating and deintercalating lithium, a positive electrode containing a transition metal and lithium, and a nonaqueous electrolyte having a lithium salt dissolved in an organic solvent, wherein the nonaqueous electrolyte is the nonaqueous electrolyte according to claim 1.

* * * * *